(12) United States Patent
Cameron et al.

(10) Patent No.: US 7,181,472 B2
(45) Date of Patent: Feb. 20, 2007

(54) METHOD AND SYSTEM FOR SYNCHRONIZING IDENTITY INFORMATION

(75) Inventors: Kim Cameron, Bellevue, WA (US); Don Hacherl, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 61 days.

(21) Appl. No.: 10/693,175

(22) Filed: Oct. 23, 2003

(65) Prior Publication Data

US 2005/0091290 A1 Apr. 28, 2005

(51) Int. Cl.
*G06F 17/30* (2006.01)

(52) U.S. Cl. .................. 707/201; 707/10; 707/200; 709/231

(58) Field of Classification Search ........ 707/100–206, 707/10; 709/203, 230, 231
See application file for complete search history.

(56) References Cited

U.S. PATENT DOCUMENTS

| | | | |
|---|---|---|---|
| 5,640,566 A | 6/1997 | Victor et al. | 717/113 |
| 5,884,328 A | 3/1999 | Mosher, Jr. | 707/202 |
| 6,212,529 B1 | 4/2001 | Boothby et al. | 707/201 |
| 6,269,369 B1* | 7/2001 | Robertson | 707/10 |
| 6,269,405 B1* | 7/2001 | Dutcher et al. | 709/248 |
| 6,317,797 B2 | 11/2001 | Clark et al. | 710/5 |
| 6,463,149 B1* | 10/2002 | Jolissaint et al. | 379/265.09 |
| 6,530,081 B1* | 3/2003 | Hayes, Jr. | 717/176 |
| 6,539,381 B1* | 3/2003 | Prasad et al. | 707/10 |
| 6,748,402 B1* | 6/2004 | Reeves et al. | 707/201 |
| 6,799,190 B1* | 9/2004 | Boothby | 707/204 |
| 6,925,595 B1* | 8/2005 | Whitledge et al. | 715/513 |

OTHER PUBLICATIONS

"Optimal replication algorithms for hierarchical mobility management in PCS networks" by Qing Tian; Cox, D.C.; Computer Networks, vol. 38, No. 4, p. 447-59; Mar. 15, 2002.

"Mobile devices and mobile data-issued of identity and reference" by Lucas, P.; Human-Computer Interaction, vol. 16, No. 2-4, p. 323-36; 2001.

"Disconnected operations' synchronization facility extension for mobile terminal's messaging system" by Saito, M.; Yoshida, R.; Transactions of the Information Processing Society of Japan, vol. 42, No. 11, p. 2780-8; Nov. 2001.

"On-line profile replication for hierarchical mobility management in PCS networks" by Tian, Qing; Cox, Donald C.; IEEE Infocom 2002, Proceedings—IEEE INFOCOM v 3 2002, p. 1288-1297.

(Continued)

*Primary Examiner*—Greta Robinson
*Assistant Examiner*—Cheryl Lewis

(57) ABSTRACT

An identity system and method that stores identity information related to different principals and stores the identities on different or disparate systems such that the different systems can use the identities. A synchronization process synchronizes identity information and rules based on identity information between a primary computer system and a disparate secondary computer system. Accordingly, the secondary computer system has a representative database of identity information following receipt of the converted information, wherein the representative database is representative of a primary database of identity information stored on the primary computer system. In order to synchronize a conversion may take place. The conversion process may be performed by a dedicated process designed for the secondary system. Alternatively, the conversion is performed by a generalized process using mapping tables designed to convert identity information into multiple different formats.

27 Claims, 8 Drawing Sheets

OTHER PUBLICATIONS

"A global authentication service without global trust" by Birrell, A.D.; Lampson, B.W.; Needham, R.M.; Schroeder, M.D.; Proceedings of the 1986 IEEE Symposium on Security and Privacy (Cat. No. 86CH2292-1), p. 223-30.

"Wireless distributed data acquisition system" by Priddy, B.; Jovanov, E.; Proceedings of the Thirty-Fourth Southeastern Symposium on System Theory (Cat. No. 02EX540), p. 463-6; 2002.

"Personal communications networking architecture and functionality evolution" by Verma, M.K.; TENCON '92, 'Technology Enabling Tomorrow' 19912 IEEE Region 10 International Conference. Computers, Communications and Automation towards the $21^{st}$ Century (Cat. No. 92CH3223-5), p. 2127-21, vol. 1.

"Naming and addressing of objects without unique identifiers" by Fujinami, N.; Yokote, Y.; Proceedings of the $12^{th}$ International Conference on Distributed Computing Systems (Cat. No. 92CH2175-7), p. 581-8; 1992.

Tian, Q. et al., *Optimal replication algorithms for hierarchical mobility management in PCS networks*, Computer Networks 38, pp. 447-459 (2002).

Birrell, A., et al., *A Global Authentication Service without Global Trust*, Proceedings of the 1986 IEEE Symposium on Security and Privacy, pp. 223-230 (1986).

Lucas, P., *Mobile Devices and Mobile Data—Issues of Identity and Reference*, Human-Computer Interaction, vol. 16, pp. 323-336 (2001).

Fernique, P., et al., *CDS GLU, A Tool for Managing Heterogeneous Distributed Web Services*, Astronomical Society of the Pacific Conference Series, vol. 145, pp. 466-469 (1998).

Tian, Qing, et al., *Location Management in a Heterogeneous Network Environment*, IEEE Wireless Communications and Networking. vol. 2, pp. 753-758 (2000).

Paskin, N., *Toward Unique Identifiers*, Proceedings of the IEEE, vol. 87, No. 7, pp. 1208-1227 (1999).

Neame, R., *Communications and HER: Authenticating Who's Who is Vital*, International Journal of Medical Informatiics. vol. 60, No. 2, pp. 185-190 (2000).

Cingil, I., *Supporting Global User Profiles Through Trusted Authorities*, SIGMOD Record. vol. 31, No. 1, 1. 11-17 (2002).

Adya, A., et al., *Analyzing the Browse Patterns of Mobile Clients*, Proceedings of the First ACM SIGCOMM Internet Measurement Workshop, pp. 189-194 (2001).

Kondo, T., et al., *A Resource Reverence Technique Independent from Scheme and Location*, Proceedings of the IASTED International Conference on Internet and Multimedia Systems and Applications. pp. 377-382 (2001).

Hung, Chi Chi, et al., *Adaptive Proxy-based Content Transformation Framework for the World-Wide Web*, Proceedings on the Fourth International Conference/Exhibition on High Performance Computing in the Asia-Pacific Region. vol. 2, p. 747-50. (2000).

Carlier, D., et al., *Task Delegation Model Assigned to Mobile Computing*, Proceedings of ICICS. vol. 1, p. 220-4. (1997).

*Principles of Access Control*, Modern Office Technology. vol. 34, No. 11, p. 44-5, 48. (Nov. 1989).

Samaras, G., et al., *Managing Transaction Identifiers in the Peer-to-Peer Distributed Transactional Environment*, IBM Corporation. p. 796-803.

Booth, L., *Implementing Distributed Applications Using Object Technology*, Object EXPO Europe Conference Proceedings. p. 141-4. (1993).

Pasaya, B., et al., *A Temporal Object Oriented Conceptual Schema Model*, IEEE Pacific RIM Conference on Communications, Computers and Signal Processing. vol. II, p. 724-727. (2001).

Sollins and Masinter, *Functional Requirements for Uniform Resource Names*, Network Working Group, Request for Comments: 1737, Dec. 1994.

Dafni, G.J., *Generating Unique Identifiers In A Distributed System*, University of Texas at Austin, 14 pp., (1985).

Cooley, R., et al., Dept. of Comput. Sci. & Eng., Minnesota Univ., *Data Preparation for Mining World Wide Web Browsing Patterns*, Knowledge and Information Systems, vol. 1, No. 1, pp. 5-32.

Hollosi, A. et al., Advanced Communications and Multimedia Security—Automatic Authentication Based on the Austrian Citizen Card, *A Reference Implementation*, pp. 241-253.

Butler, R., et al., *Computer—A National-Scale Authentication Infrastructure*, pp. 60-66 (2000).

Plaice, J., et al., DCW 2002 (2002:Sydney, N.S.W.): Distributed communities on the Web: 4th International Workshop—PIÑAS: Supporting a Community of Co-authors on the Web, pp. 113-124 (2002).

Kent, Stephen, *Evaluating Certification Authority Security*, 1998 IEEE Aerospace Conference Proceedings, vol. 4, pp. 319-327.

Lee et al., *Concatenated Wireless Roaming Security Association and Authentication Protocol using ID-Based Cryptography*, Conference Proceedings of the IEEE Vehicular Technology Conference, vol. 2, New York, NY, pp. 1507-1511 (c.1978-1979).

Xuhua Ding and Gene Tsudik, *Simple Identity-Based Cryptography with Mediated RSA*, The Cryptographers' Track at the RSA Conference 2003, San Francisco, CA, pp. 193-210 (Apr. 13-17, 2003).

Mevel and Simon, *Distributed Communication Services in the Masix System*, Conference Proceedings of the 1996 IEEE Fifteenth Annual International Phoenix Conference on Computers and Communications, pp. 172-178 (Mar. 1996).

Ninghui Li, *Local Names In SPKI/SDSI*, Proceedings of the 13th IEEE Computer Security Foundations Workshop, pp. 2-15 (2000).

* cited by examiner

```
<ms:iCard ICardID="9e0d704c-20bf-495c-afe1-76ba2db6f6c3" MajorVersion="1"
  MinorVersion="0" SubjectType="Person" ICardType="New" IssueInstant="2003-08-
  21T00:02:07Z" xmlns:ms="http://www.microsoft.com/security/2003/IS/iCard">
<saml:AttributeStatement xmlns:saml="Urn::oasis:names:tc:SAML:1.0:assertion">
  <saml:Subject>
    <saml:NameIdentifier Format="saml:#emailAddress">
    jsmith@msn.com
    </saml:NameIdentifier>
  </saml:Subject>
  <saml:Attribute AttributeName="DisplayName"
  AttributeNameSpace="http://www.microsoft.com/security/2003/IS/iCard">
    <saml:AttributeValue>
      <ms:DisplayName>John Smith</ms:DisplayName>
    </saml:AttributeValue>
  </saml:Attribute>
</saml:AttributeStatement>
<ds:KeyInfo xmlns:ds="http://www.w3.org/2000/09/xmldsig#">
  <ds:X509Data>
    <ds:X509Certificate> base-64 encoded certificate omitted </ds:X509Certificate>
  </ds:X509Data>
```

Fig. 5

METHOD AND SYSTEM FOR SYNCHRONIZING IDENTITY INFORMATION

TECHNICAL FIELD

The present invention relates to identifying entities, and more particularly to identification of principals within a computing environment. More particularly still, the present invention relates to sharing and synchronizing existing identities among two or more computer systems.

BACKGROUND OF THE INVENTION

Many different computer systems having many different proprietary platforms exist. For instance, handheld computer systems, such as telephones and/or personal digital assistants (PDAs), have been developed with their own specific operating systems, features and capabilities that are different from other systems such as more traditional desktop and laptop computer systems. Moreover, larger systems, such as servers, typically have their own operating system platforms that are also different than the desktops, laptops, telephones and PDAs. Often however, these different systems need to communicate with one another.

In order to provide such communication, computer programs or applications have been written to allow synchronization of information from one system to another. For instance, handheld computer systems provide methods of synchronizing information that has changed or been added on a desktop computer system. E.g., address book and calendar applications have been created that provide communication between a desktop computer system and handheld computer systems wherein changes to an address book entry, such as a contact, or a calendar entry on the desktop system will be propagated to the handheld machine during a synchronization operation or process.

Unfortunately however, in order to provide such synchronization, a version of the application, e.g., the specific address book or calendar application must be present on both computer systems. Otherwise, the formatting of the information is unrecognizable and cannot be synchronized. Consequently, the different proprietary systems must create specific applications for the sole purpose of synchronizing information, if such synchronization is desired. Such a result is unsatisfactory as many different systems have their own, preferred format for information. As an example, a telephone computer system may only need a name and a telephone number for a particular contact. Such a system would be overwhelmed with creating, storing and executing a new application to communicate with a desktop system and then receiving, parsing and storing the extraneous information, such address and email information for the contact it receives from the desktop computer system upon synchronization. This problem is compounded when a particular user may, in fact, use three or more different systems, e.g., a desktop computer system, a telephone and a PDA, which may all have their own representation of a particular contact.

It is with respect to these and other considerations that the present invention has been made.

SUMMARY OF THE INVENTION

In accordance with the present invention, the above and other problems are solved by a system that shares information between two or more computer systems without necessarily having versions of an application on both systems. The system stores information on the two or more systems using the format or representation requested by each particular system. In particular, the present invention relates to an identity system that stores identity information related to different principals and stores the identities on different or disparate systems such that the different systems can use the identities.

In accordance with certain aspects, the present invention relates to systems and methods of synchronizing identity information between a primary computer system and a disparate secondary computer system, wherein the primary computer system and the secondary computer system store identity information in different formats. Embodiments of the invention involve first connecting the primary computer system and the secondary computer system to provide communication capability between the primary computer system and the secondary computer system and then determining new identity information exists on the primary computer system and that a synchronization operation should be performed. Next, a conversion process is performed that converts the new identity information into a different format, the different format associated with the secondary computer system. Finally, a propagation or synchronization process propagates the converted information to the secondary computer system. The process may be performed by the operating system of the primary computer system. Accordingly, the secondary computer system has a representative database of identity information following receipt of the converted information, wherein the representative database is representative of a primary database of identity information stored on the primary computer system. In accordance with certain aspects, the representative database on the secondary computer system has less identity information than the primary database. In some cases, the new identity information may originate from a secondary computer system and be converted and stored on the primary computer system.

In certain embodiments the secondary computer system is a telephone system and the identity information comprises contact information. In other embodiments, the secondary computer system(s) may be handheld personal digital assistant computer systems, email account system, among many other types of computer systems. Further, the new identity information may be entered into the primary computer system by a user or it may be entered into the primary computer system by another secondary computer system.

The conversion process, in some embodiments, may be performed by a dedicated process designed for the secondary system. In other embodiments however, the conversion is performed by a generalized process designed to convert identity information into multiple different formats. In such a case, the primary computer system receives a mapping table of information from the secondary computer system, wherein the mapping table maps identity claim elements in a primary format, wherein the primary format is the format of the primary database, to identity claim elements in a secondary format, wherein the secondary format is the format of the secondary database; and this table is used by the generalized process to convert identity information into the secondary format.

According to other aspects, the present invention relates to a system and method of synchronizing rule information between a primary computer system and a disparate secondary computer system, wherein the primary computer system and the secondary computer system store identity information in different formats, wherein the primary computer system and the secondary computer systems have representative databases of identity information and wherein the method comprises. In this case, the invention involves connecting the primary computer system and the secondary computer system to provide communication capability between the primary computer system and the secondary computer system; determining new rule information exists and that a synchronization operation should be performed; and propagating the new identity information from one computer system to the other. Further, the invention may also convert the new rule information into a different format, the different format associated with the secondary computer system.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

BRIEF DESCRIPTION OF THE DRAWINGS

FIG. 5 is a block diagram illustrating a generalized manner for storing identity information documents according a particular embodiment of the present invention.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
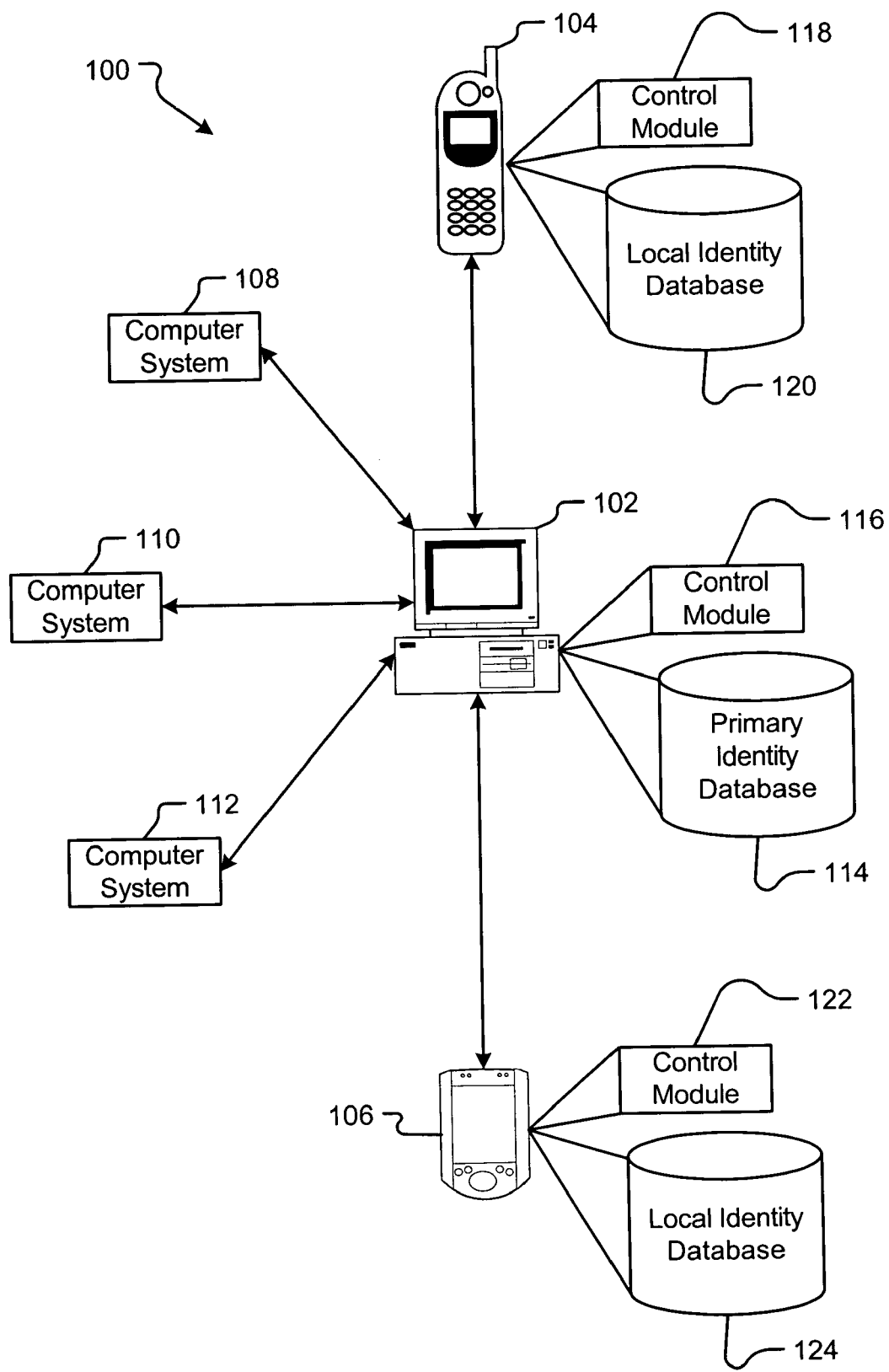
FIG. 1 illustrates an exemplary system according to an embodiment of the present invention.

In general, the present invention relates to synchronizing information, and in particular identity information and identity related rules across a plurality of disparate computer systems. In accordance with embodiments of the invention, the methods described herein may be performed on a single, stand-alone computer system but are more typically performed on multiple computer systems interconnected to form a distributed computer network. An environment 100 for performing the synchronization as contemplated by the present invention is shown in FIG. 1. The environment 100 has a computer system 102, which is considered the primary computer system. As used herein, a "computer system" shall be construed broadly and is defined as "one or more devices or machines that execute programs for displaying and manipulating text, graphics, symbols, audio, video, and/or numbers."

The primary computer system 102 communicates with secondary computer systems, such as cell phone computer system 104 and personal digital assistant (PDA) computer system 106. The primary computer system 102 may further communicate with many other computer systems, such as systems 108, 110 and 112 in order to synchronize information, if desired. Although system 102 may communicate with many other systems, such as systems 108, 110 and 112, the present discussion focuses on the exemplary communication between system 102 and systems 104 and 106. As such, the systems 108, 110 and 112 shown in FIG. 1 are shown only to indicate that many other connections and communications are contemplated by the present invention.

The systems 102, 104, 106, 108, 110 and 112 communicate using one or more known communication protocols, either wirelessly or through a direct-wired connections. Furthermore, the systems 102, 104, 106, 108, 110 and 112 may communicate via separate protocols such as TCP/IP or other network and/or communication protocols, implemented over networks such as the Internet (not shown). That is, although shown as connected by seemingly direct arrows, the separate systems 104, 106, 108 110 and 112 may in fact communicate with system 102 via other indirect ways. Indeed, the connections shown in 100 merely indicate that information may be relayed between systems. As such, the definition of a communication used herein relates to the transfer of a message, an event, or any other information from one system to another.

In an embodiment of the present invention, the system 102 converts and/or filters synchronized information into the form required by the secondary systems, such as systems 104 and 106 prior to sending the same. Since the other computer systems require the information be stored in a different format, the systems are considered disparate. As a result of the conversion, the secondary systems need not store and execute extraneous applications locally. Further, the present invention relates to the synchronizing of information between disparate computer systems, wherein the different computer systems are owned and operated by the same user or the same association, such that an up-to-date, consistent and meaningful collection of identity information is present on the separate computer systems.

According to aspects of the present invention, the primary computer system 102 stores identity information in a primary identity database 114. In general, the "identity information" comprises a plurality of separate, distinct identity resources or documents, wherein an identity resource is associated with a known principal. As defined herein, a principal is any individual, group of individuals or computer module that performs some action in a computing environment. Exemplary principals include operating systems, computer application programs and processes implemented on an operating system, individuals, and groups of people (e.g., households, corporations, organizations, etc.).

In an embodiment, an identity resource is created for each known principal. A resource is defined herein as a machine-readable form of data arranged in a manner to constitute an electronic file. Consequently, an identity resource is an electronic representation or "identity" of a principal. Such an identity resource is also referred to herein as an "identity information document," a "principal object" and an "identity information object." The identity resource uniquely identifies the principal to which it corresponds. As an example, the system 102 may comprise many identity resources relating to the people known to the user of system 102. Each identity resource may include such information as a person's name, telephone number, email address, among other identifying elements or, i.e., identity claims. Indeed, there may be many other identity claims such a person's public key, IP address for their computer system, group associations, use policies, etc. For more information on identity claims and identity resources, see U.S. Patent Application for IDENTITY SYSTEM FOR USE IN A COMPUTING ENVIRONMENT (application Ser. No. 10/693,021), which is commonly assigned to the assignee of interest in this application and which was filed on Oct. 23, 2003, the specification of which is incorporated by reference into this application.

System 102 also has a control module 116 used to perform many operations of creating identity resources, storing identity resources and other management functions related to the identity resources stored in the primary identity database 114. Moreover, control module 116 is used to manage communications between system 102 and other systems, such as systems 104 and 106, for example. The control module, therefore manages the transfer of identity resources to other systems 104 and 106 as well as the synchronization of such identity resources.

In order to transfer information system 104, system 104 also has a control module 118. Control module 118 operates to facilitate communication with control module 116 on system 102. System 104 maintains a local identity database 120, storing a plurality of identity resources. In an embodiment, the local identity database 120 has one identity resource for each identity resource located on the primary identity database 114. That is, upon synchronization between system 102 and 104, any identity resources located on either database 114 and/or 116 that are not located on the other database are copied or transferred to the other database to update the other database. Consequently, the local database 120 may be considered a replica of database 114 in terms of the principals represented by the identity resources in database 114.

Although database 120 stores, following synchronization, one identity resource for each identity resource in database 114, the actual identity resource in database 120 may differ from the corresponding identity resource stored information in database 114. The type and quantity of information stored in database 120 may not be the same as that stored in database 114. For example, since system 104 is a cell phone, the database 120 stored thereon may store only a streamlined version of the database 114. In an embodiment, for each identity resource stored on database 114, the database 120 may store simply a name and a phone number. Accordingly, the database 120 may not include all the information available for any or all given principals having more comprehensive identity resources stored on database 114. Since the database 120 on the secondary system has an entry for each principal on the primary database 114, albeit in a different format and potentially with less (or different) information, the database 120 is considered to be a "representative" database of the primary database 114.

PDA computer system 106 also has a control module 122 and a database 124 used to communicate with control module 116 on system 102 and for storing identity information, respectively. As may be appreciated, the local database 124 stores one identity resource for each identity resource on primary database 114, but may not store all the information for each identity resource. That is, as with system 104, system 106 generally has fewer computing resources than system 102 such as memory, computing power, communication capability, etc. Because of these limitations, PDA system 106 may only need abbreviated versions of each identity resource stored locally. However, the versions of each identity resource stored on system 124 may be larger or smaller than those stored on system 104 in database 120, depending on the needs and capabilities of the different systems 104 and 106.

Not only are the identity resources stored on the local databases 120 and 124 different in the amount of information stored, the format used to store the information on system 104, and thus in database 120 may also be different than the format used to store the same information on database 114. In general, the control module 116 on system 102 converts the data on database 114 into the format required by system 104. Consequently, the control module 118 need not perform such conversions prior to storing the data on database 120.

Figure 2:
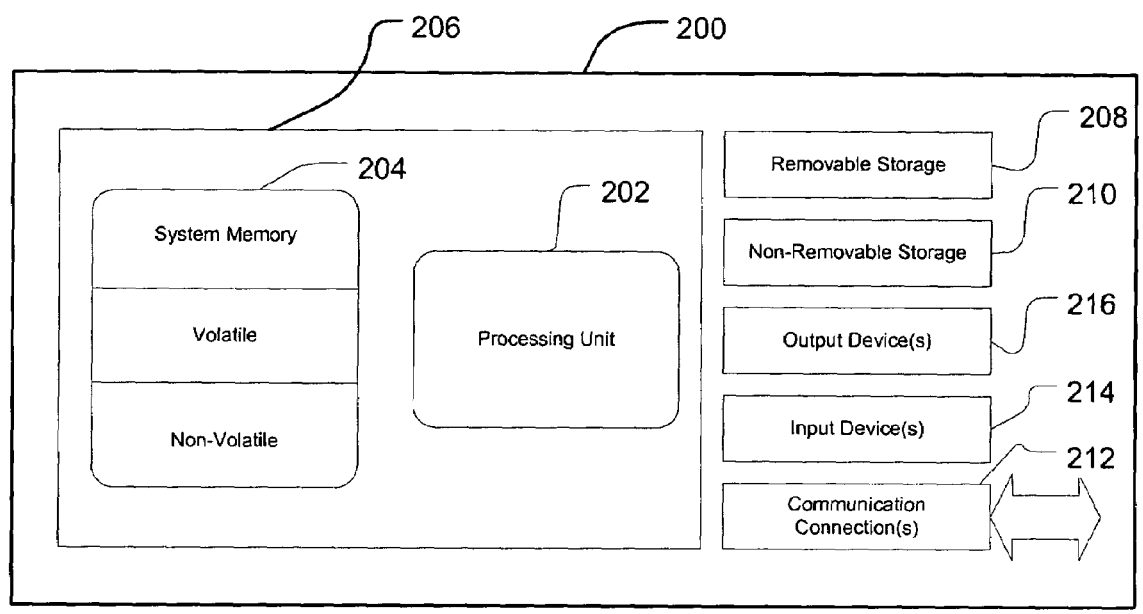
FIG. 2 shows a computer system that may be used according to particular aspects of the present invention.

FIG. 2 illustrates an example of a suitable computing system 200 on which embodiments of the invention may be implemented. As such, this system 200 is representative of one that may be used to function as computer system 102, 104 and/or 106 in the distributed computing environment 100. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system 200 may include at least one other form of computer-readable media. Computer readable media, also referred to as a "computer program product," can be any available media that can be accessed by the system 200. By way of example, and not limitation, computer-readable media might comprise computer storage media and communication media.

Computer storage media includes volatile and non-volatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

The exemplary computing system 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, displays, speakers, and printers. Each of these "peripheral devices" are well know in the art and, therefore, not described in detail herein.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
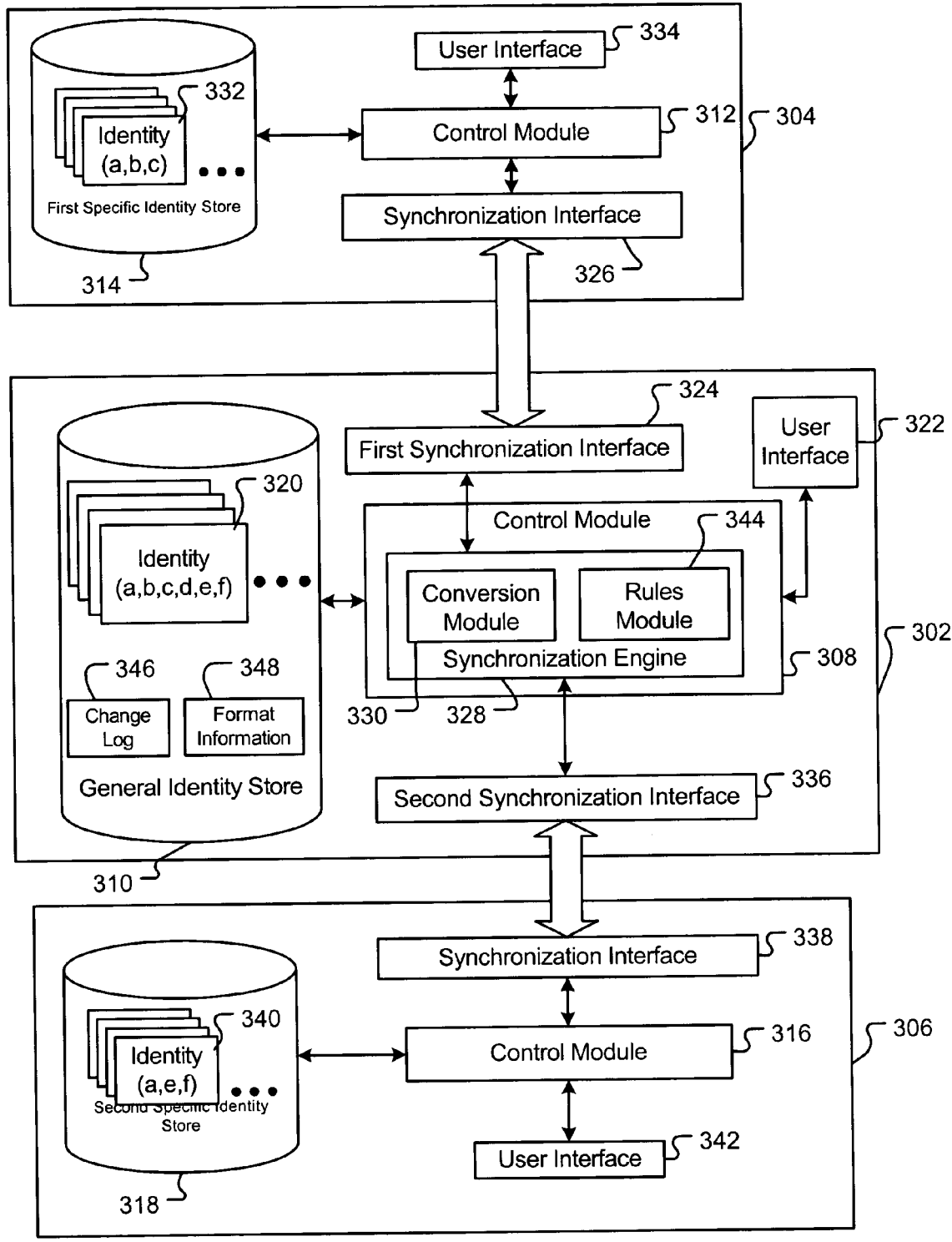
FIG. 3 illustrates a representation of the software environment for synchronizing identity information documents according to aspects of the present invention.

Referring now to FIG. 3, the functional components used in synchronizing identity information between a primary computer system 302 and other computer systems 304 and 306 are logically illustrated in accordance with an embodiment of the present invention. In general, the system 302 is a functional representation of system 102 (FIG. 1). Also, systems 304 and 306 are functional representations of systems 104 and 106 (FIG. 1). Therefore, as may be appreciated, the control module 308 and identity store 310 correspond to control module 116 and database 114 (FIG. 1). Likewise, control modules 312 and 316 correspond to control modules 118 and 122 respectively. Also, data stores 314 and 318 correspond to databases 120 and 124 respectively. In an embodiment, the functional components of system 302 reside in the operating system and thus provide, as part of the platform, a system that stores identity information and also the identity information with other computer systems.

As stated above, system 302 represents a primary computer system. The primary computer system 302 has a general identity store 310 that stores a plurality of identities 320. Each one of the plurality of identities 320 relates to a particular principal and is stored in the data store 310 as an identity information document or identity resource. Further, each identity information document stored in the general identity store 310 may have several information elements or claims as represented by the parenthetical letters "a,b,c,d,e, f" in FIG. 3. These information elements relate to the specific information identifying either the particular principal, such as name, address, telephone number, or identifying the identity information document itself, as discussed in more detail below in conjunction with FIG. 4.

The system 302 further includes a control module 308 that operates to manage the general identity store 310. The control module may receive information from a user interface module 322. That is, a user of system 302 may enter new identity information documents or make changes to existing information documents or even delete existing identity information documents through user interface module 322. Upon receiving such change requests, control module 308 performs the operations necessary to complete the request. Similarly, although not shown, such change requests (add, edit and/or delete) may come from other modules (not shown), such that the control module may carry out various changes to the database due to requests from many different modules. As an example, a user may receive an email with a new identity information document. In such a case, the control module may, in one embodiment, automatically add the new identity information document to the database 310 without user interaction. Other embodiments may require that the user manually request such an addition however in order to control which identity information documents are added to the database 310. As another example, a user may receive an email with an updated information document and thus the control module 308 may automatically update the stored identity information document. Such an update may or may not require user interaction. Yet another example wherein the control module may automatically change the contents of the database 310 without user interaction relates to received updates, additions or deletions from other systems 304 and/or 306, as discussed in more detail below.

Control module 308 also communicates with a first synchronization interface module 324. The first synchronization interface module 324 communicates, in turn with a synchronization interface module 326 on system 304. The control module uses a synchronization engine 328 to perform synchronization steps. In general, the synchronization engine 328 compares the properties of the identity information documents stored on the general identity store to those compared on the first specific identity store 314 and determines the differences between the two. For example, the synchronization engine identifies which ones are not present on one but are present on the other. Also, synchronization engine also determines which ones have changed and which ones have been deleted since the last synchronization process. Upon determining the differences, the synchronization engine, through the synchronization modules 324 and 326 propagates the changes to the system 304 and ultimately to the database 314. In an embodiment, a change log 346 may be used to quickly identify changes since the last synchronization.

Also, the synchronization engine 328 has a conversion module 330 that is used to convert information in one format, such as the format of the general identity store 310 to another format such as that requested by store 314 prior to sending the information. Also, conversion module 330 may further filter or strip predetermined information prior to sending the information to the system 304. The conversion module 330 and hence the synchronization engine 328 understand not to send an update based on information that is not ultimately stored on the new system 304. For example, if the address field in a particular identity information document has changed, but the address field is not stored on 304, no updates will be made to the 304 with respect to the address change.

Thus, synchronization engine 328 understands not only the format of the document that is ultimately stored on 304 and but also the type of information to be stored on 304 such that the synchronization engine only makes relevant updates. In order to understand the format and type of information to be stored, synchronization engine 328, in an embodiment, relies on a stored format information resource 348, which dictates the format for the items stored on store 314 and the available parameters or fields of the items to be synchronized. Such a format information resource 348 is typically provided to the synchronization engine 328 during an initialization phase in which both systems 302 and 304 provide relevant information to the other system allowing future synchronization procedures. The format information resource 348 may be stored in file as part of the general identity store 310 as shown in FIG. 3 or in another location. In other embodiments, the format information is provided each time the synchronization procedure begins. In yet other embodiments, the synchronization engine sends all the updates, but the receiving device 304 only accepts the appropriate changes.

In a particular embodiment, the format information resource is a table of information. The table of information maps elements of the identity resource format of the secondary system, such as system 304 to similar elements of the identity resource format of the primary system, such as system 302. For example, system 304 may correspond to an email server which may represents "work phone" as one attribute on an object, "home phone" as another, and "email address" as a third. In such a case the table identifies these attribute objects and equates or maps them to similar identity claims of the identity resource. Thus, the conversion module can simply look up the attribute designation in the table to understand how to convert the identity resource into the proper format.

Using this method, other conversions are simplified as the proper table of information is all that is needed to be supplied to the system 302. For instance, continuing the above example, another device may factor things differently, having (essentially) five properties per identity resource called Address1 through Address5, each of which has a category ("home", "work", "mobile", "email", etc) and a value. Other systems may also use a similar categorized collection for phone numbers, but put email address into a separate collection. In these cases, the conversion module 330 is able to map properties on object 320 to different properties on objects 332 and 340 and vice versa since the table provides the mapping directions to the conversion module 330. Of course, if the mapping is one-to-one (e.g., "first name" becomes "given name") the process is straightforward and a table may not be necessary. However, given these different systems, each with their own methods of combining and splitting values and properties, the above-described table method results in one piece of code that can handle any transform just by being given a new table such that custom code does not have to be written for each foreign system.

In operation, upon determining that a synchronization operation should be performed, synchronization module 328 retrieves the information from the general identity store 310. If necessary conversion module 330 converts the information to the necessary format using format resource 348 that corresponds to system 304. Upon converting the information, synchronization module 328 passes the updated information to the first synchronization interface 324 which passes the information to synchronization interface 326 on system 304. Upon receiving the updated information control module 312 stores the new information in the first specific identity store 314. As shown, the newly updated identity 332 in store 314 may have less than all the information of the identity 320 in store 310. This is because, in this example, the system 304 does not need elements d, e, and f such that these elements are not passed to system 304. Upon storing the updated identity in store 314, user interface module 334 may be used to display the identity on system 304 to a user of the same.

In a similar manner, upon determining that a synchronization operation should be performed, synchronization module 328 operates to synchronize information on system 306. In essence, synchronization module 328 retrieves the information from the general identity store 310 and if necessary conversion module 330 converts the information to the necessary format using a format resource 348 that corresponds to system 306. Upon converting the information, synchronization module 328 passes the updated information to the second synchronization interface 336, which passes the information to synchronization interface 338 on system 306. Upon receiving the updated information control module 316 stores the new information in the second specific identity store 318. As shown, the newly updated identity 340 in store 318 may have less than all the information of the identity 320 in store 310. This is because, in this example, the system 306 does not need elements b, c, and d such that these elements are not passed to system 306. Also, it is noted that the format and elements can and typically are different on separate secondary systems such as systems 304 and 306. Upon storing the updated identity in store 318, user interface module 342 may be used to display the identity on system 306 to a user of the same.

In an embodiment of the invention, user interface modules 334 and 342 may be used to add, edit and delete local copies of identity documents, such as documents 332 and 340, respectively. These changes may then be propagated to the primary system 302. In essence, upon synchronization, the changes to the identity documents may pass back to the primary system 302 to update the general identity store 310. For example, a user of system 304 may make a change to a telephone number field on identity document 332. Upon making the change, a local change log (not shown) on system 304 may be updated. Then, upon synchronization, control module 312 may pass the newly updated identity 332, with the new telephone number, through the synchronization interface 336 and first synchronization interface 324 to the control module 308, and ultimately to the synchronization engine 328. The synchronization engine 328 determines if any conversions must be made to convert the change into a generalized form, and if so, uses conversion module 330 to perform such conversion. Upon converting the information, the identity information is then stored in the general identity store 310. At such time, the change log may be modified to alert the synchronization engine 328 that an update is necessary on all other secondary systems such as system 306. Consequently, at a later synchronization operation with system 306, the update that originated with system 304 will be propagated to system 306, assuming system 306 is interested in the change, such as telephone number changes.

In a particular embodiment, the synchronization engine 328 further includes a rules module 344. The rules module 344 stores rule information related to certain identities or with respect to all identities. Such rules may further relate to events in notifying users of secondary systems 304 and 306. Upon entering or modifying a rule, such as through user interface 322, the rule is then propagated to the various secondary systems, such as systems 304 and 306, during a synchronization operation. Upon receiving rules, secondary systems 304 and 306 apply the rules as necessary.

For example, the user of system 302 may not want to receive phone calls from friends during working hours and may enter this rule into system 302 through user interface 322. Assuming one or more identities 320 have an associated flag or field identifying the principal(s) as a friend, then phone calls from those principals should not be allowed during working hours, e.g., 8:00 AM to 5:00 PM, Monday through Friday. This rule may be passed to system 304 (a cell phone for example). Since system 304 has identity information stored on its database, it can enforce the rule by matching the telephone numbers of incoming calls to the stored identities telephone numbers and determine whether to allow a call to pass through or not. In this example, the system 304, and its control module 312 have the capability to determine incoming-call, telephone numbers, match the same with the stored identities and block unwanted calls according to propagated rules.

Rules may specifically recite certain identities, while others may be more general and apply to all identities. In general, rules are entered and edited from the user interface 322, but other embodiments may allow rule changes to be entered on secondary systems, such as systems 304 and 306. Upon synchronization, the changes from secondary systems 304 and/or 306 are then updated on system 302 and passed to other systems if necessary. Moreover, since rules may be different on different computer systems, e.g., one rule for accepting telephone calls is appropriate for a telephone computer system but may not be appropriate for an email computer system, the conversion module 330 may also convert rules into the appropriate format for the secondary computer system currently being synchronized prior to the transmission of the rule. In order to complete the conversion, a predetermined set of rule-conversion data (not shown) is stored on the system 302 for use. The predetermined rule-conversion data identifies the appropriate rules and their format such that conversion module is able to translate a given rule on the system 302 into appropriate rules on the secondary system(s).

Figure 4:
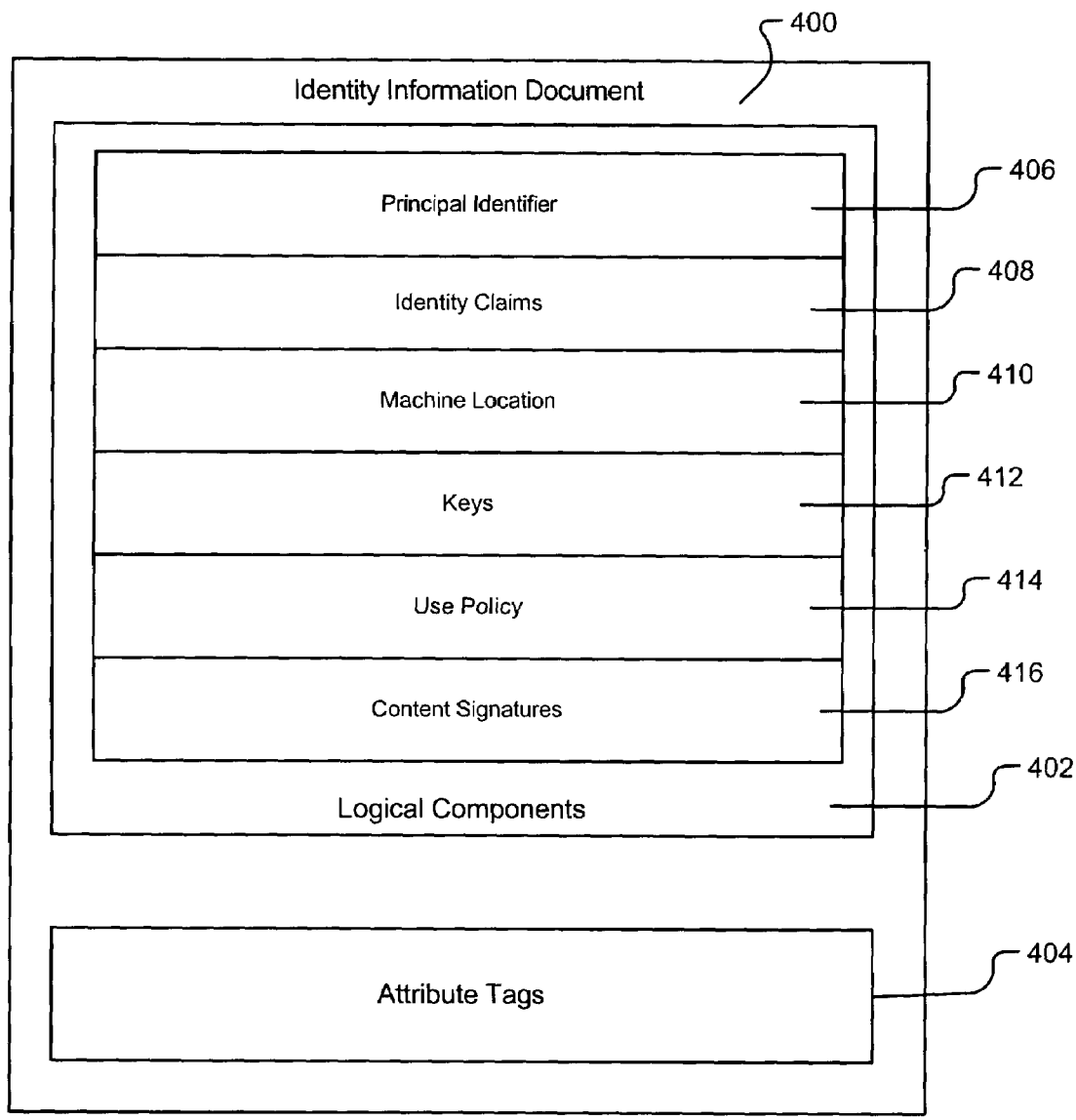
FIG. 4 illustrates the structure of an identity information documents according to particular aspects of the present invention.

An exemplary format for an identity information document 400 that may represent an identity information document stored in the general identity store 310 (FIG. 3) is shown in FIG. 4. As a data structure, the identity information document 400 is a collection of identity claims and other attribute/property claims that may be bound to a public key and governed by an embedded use policy. XML may be used as the encoding language for the identity information. However, other formats are considered equally suitable. The elements of the identity information document 400 may also be optionally encrypted if they contain information whose confidentiality must be maintained.

The data within the identity information document 400 can be divided into two categories, including a set of logical components 402 and a set of attribute tags 404. The identity information document 400 has six principal logical components: 1) a principal identifier 406; 2) one or more identity claims of the principal 408; 3) a display name and zero or more selectively disclosed attributes of the principal 410; 4) one or more keys 412 for the principal enveloped in any acceptable formats (for example public keys in X509v3 certificates); 5) a use policy that expresses the principal's privacy requirements 414; and 6) a digital signature over the entire content of the identity information that protects the integrity of the data and authenticates the sender in the case of identity information updates 416. Each of these six logical components 402 are discussed in turn below.

The principal identifier 406 is a user-friendly handle that identifies the principal that is the principal of the identity claims contained in the identity information document 400. The preferred principal identifier 406 is the principal's email address if the principal is a person. However, the principal identifier should be construed broadly as any type of user-friendly handle that uniquely identifies a principal and may include, but is not limited to, email addresses, telephone numbers, mobile phone numbers, etc.

Identity claims 408 include additional structured information relating to the principal that is the subject of the identity information document. Identity claims should be construed broadly as descriptive information about a principal that may include, but are not limited to, physical mailing addresses, telephone and facsimile numbers, employer information, date of birth, etc. Even more particularly, "identity claims" are uniquely true about one entity (a person, an organization, etc). Thus, in some instances, a telephone number may be a valid identity claim for one person. For example, a cell phone number, a direct dial work number or a home number may be a valid identity claim for someone who does not share a cell phone, a direct dial work number or who lives alone. In other cases, a telephone may not be a valid identity claim for a single person, such as a home phone number shared by a family of people. In such a case the home telephone number could be an identity claim to represent the household, but not one individual.

The machine location 410 provides a unique address for the principal's computer system, and may include without limitation, an 'P address or a public key. Like a physical street address,' the machine location is necessary to locate, connect to, and or communicate with a computer system within a distributed network.

The keys portion 412 contains one or more keys, possibly encapsulated within a certificate format (for example, X509v3 certificates). The keys 605 can be public keys and can be included in the identity information as recognition information for the subject of the identity information. If a certificate is used, it may be self-signed or issued by a certificate authority.

The use policy 414 conveys the principal's instructions about permissible uses for the contents of the identity information document 400. For example, the use policy 414 may indicate that the contents of the identity information should not be divulged to others. A recipient's recognized identity information database, such as database 114 in FIG. 1, will store the use policy along with the rest of the information defining the principal.

The digital signature 416 provides a principal with the ability to sign data within the identity information document. XML signatures have three ways of relating a signature to a document: enveloping, enveloped, and detached. According to one embodiment of the present invention, the identity information document uses XML enveloped signatures when signing the identity information content.

The identity information document 400 can carry six or more attributes tags 404 relating to the identity information document 400 itself. Although not shown, the attribute tags may include an ID value for the identity information document 400, version information for the document 400 and/or the principal type that the document 400 represents, e.g., a person, computer or organization. Other attribute tags may also be employed.

In an embodiment, the identity information document is stored in a generalized manner on the primary computer system, such as systems 102 and 302 described above in conjunction with FIGS. 1 and 3, respectively. An illustration of the generalized manner in which the information document(s) may be stored is shown in FIG. 5.

As shown in FIG. 5, the identity information document 500, which may be referred to as an "iCard," may be created and stored in either SAML or XML (or other forms such as XRML). The sample iCard 500, shown in FIG. 5, has a few notable features. For instance, the email identifier 502 relates to a principal's email address. Further, the identity information document 500 has a display name attribute 504. For security purposes, the document 500 also has the principal's certificate 506 (omitted herein) and their digital signature 508 (omitted herein).

SAML is an XML standard for securely representing security assertions including authentication and other attribute assertions, and is well-integrated with other XML technologies such as "XPATH" and "XMLDSIG." The top-level SAML element is an Assertion, which contains a Subject and a series of Statements, where a Statement is a construct asserting that the Subject has a specific authentication property or an attribute value. The Assertion can possibly be subject to one or more Conditions. SAML is the preferred security assertions description language currently adopted by the industry.

Individual components and/or the entirety of an Assertion may be encrypted, and the whole Assertion is signed by an Issuer. The SAML format is designed to be extensible, i.e., each element discussed here can be replaced using XML substitution groups and/or extended using XML "any" elements as is known to those skilled in the art.

The schema fragments discussed herein specify the XML schema for encoding the various elements of an iCard. The various XML namespaces used and referenced in these schema definitions are shown in Table 1:

TABLE 1

XML Namespaces

| Namespace | URI |
|---|---|
| xmlns:xsd | http://www.w3.org/2001/XMLSchema |
| xmlns:ds | http://www.w3.org/2000/09/xmldsig# |
| xmlns:xenc | http://www.w3.org/2001/04/xmlenc# |
| xmlns:saml | Urn:oasis:names:tc:SAML:1.0:assertion |
| xmlns:ms | http://www.microsoft.com/security/2003/IS/iCard |

Alternative embodiments do not store the identity information documents in a generalized manner in the primary database 310. In such other embodiments, additional conversion operations may be performed to ensure that prior to sending each identity information document to another system, the document is in the proper format. Similarly, additional conversions may be required to convert received identity information documents to the required format prior to storing the same in the primary database on the primary system, such as systems 102 and 302 described above in conjunction with FIGS. 1 and 3, respectively.

Figure 6:
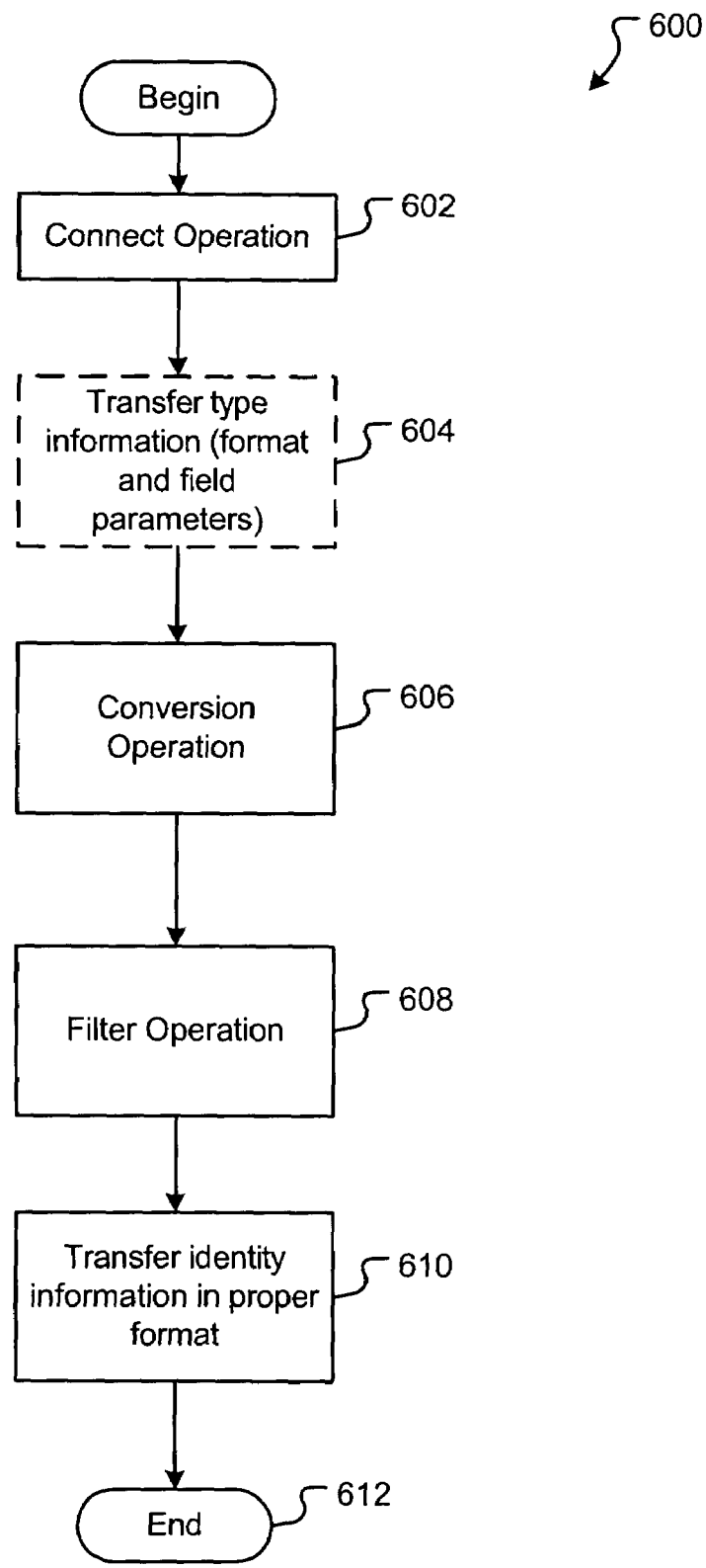
FIG. 6 is a flow diagram illustrating operational characteristics for a process for synchronizing identity information documents according to an embodiment of the present invention.

FIG. 6 is a flow diagram illustrating operational characteristics for a process for synchronizing identity information documents according to an embodiment of the present invention. In general, FIG. 6 relates to the general synchronization system and the steps involved with such a system. Initially, connect operation 602 connects two disparate systems. In an embodiment, the two disparate systems relate to a primary computer system, e.g., system 302 described above, and a secondary system, e.g., system 304 described above. The actual connection relates to known methods of providing a communication link between two systems, whether wirelessly or through a physical connection. Upon connecting, communication operations take place wherein the separate systems communicate information relating to each system's type and purpose for such connection. User interaction may or may not be involved with the initial connect operation 602. Completion of connect operation 602 involves the understanding between the two disparate systems that one or more synchronization operations are to be performed.

Following connect operation 602, optional transfer type information operation 604 transfers information regarding the format and field parameters to be used by the secondary computer system. Transfer operation 602 is optional because such information may have been transferred to the primary computer system during a previous connection.

Upon recognizing that synchronization is about to occur and once the proper format and field parameter information is available, conversion operation 606 converts data to be transferred into the proper format. Conversion operation 606 essentially retrieves the new or updated data from the database, such as database 310 (FIG. 3) and converts it from the generalized format into the desired, specific format for the secondary system. Next, filter operation 608 filters out unnecessary information. Filter operation 608 prevents unwanted update information from passing to the secondary system that does not want to store such information. For example, if the secondary system is a telephone and it does not need address information, email information, digital signatures, etc., then filter operation 608 removes this information from the converted document. In alternative embodiments, the filter operation occurs before the conversion operation 606.

Upon filtering the data, transfer operation 610 transfers the identity information from the first computer to the second computer system in the proper format. Following the transfer, flow 600 ends at end operation 612. Although not shown, another operation of storing the updated identity information on the secondary system may also be performed upon receiving the updated information.

As may be appreciated, flow 600 relates to the transfer of a single identity information document. In embodiments of the invention, flow 600 is repeated for all updated identity information documents on the primary system. Also, when a new, secondary system is connected to the primary system for synchronization, all identity documents may be copied, converted, filtered and transferred to the secondary system for storage.

Figure 7:
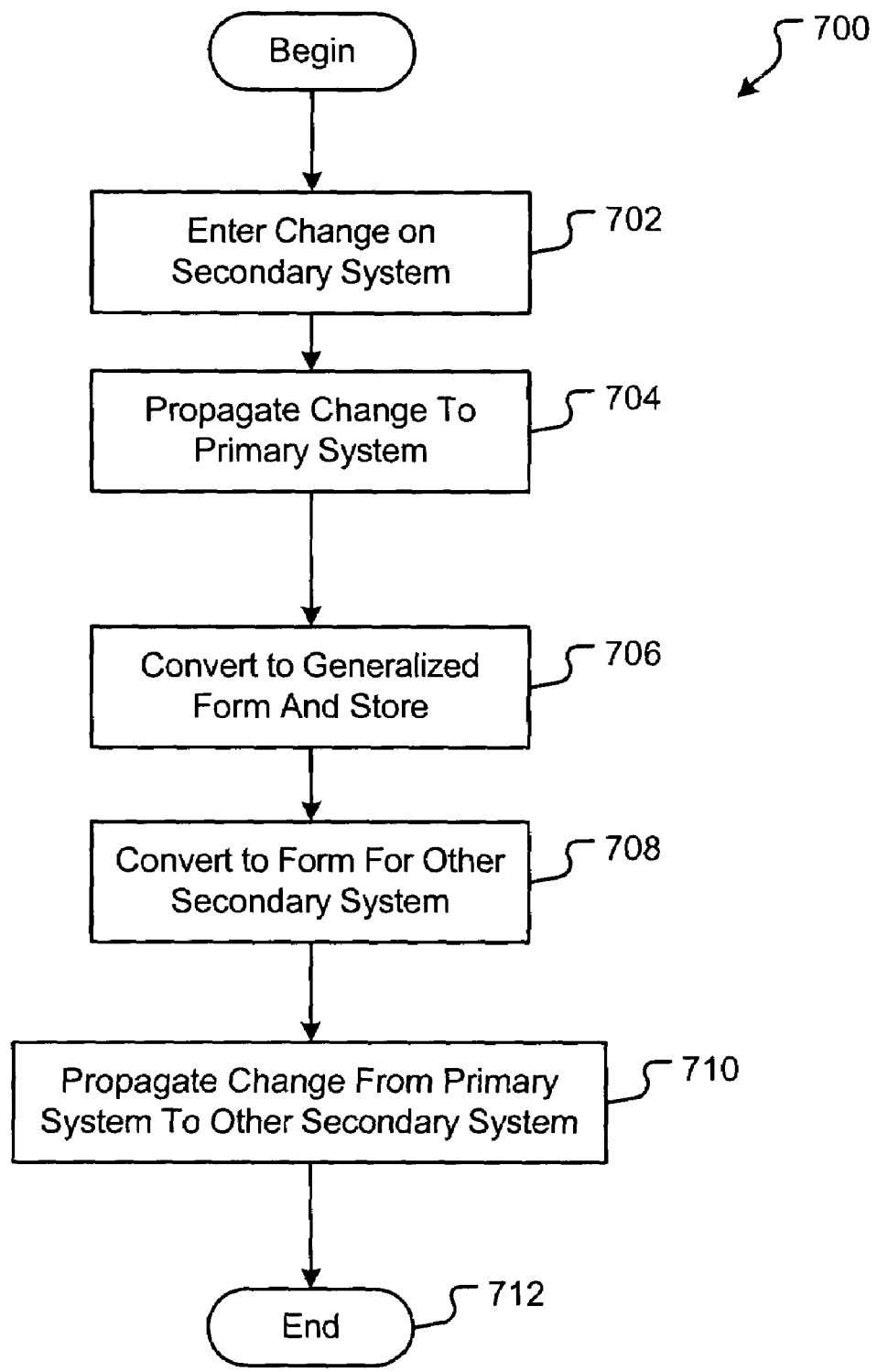
FIG. 7 is a flow diagram illustrating operational characteristics for a process for propagating identity information document updates from one secondary computer system to another secondary computer system.

FIG. 7 is a flow diagram illustrating operational characteristics for a process for propagating identity information document updates from one secondary computer system to another secondary computer system. Flow 700 begins as a change to an identity information document is entered on a secondary computer system, such as system 304 described above in conjunction with FIG. 3. In an embodiment a "change" relates to adding an identity information document, deleting an identity information document or modifying an existing identity information document. Alternative embodiments include changes to other items such as credential information or authorization information. Also, in an embodiment, a user of the secondary computer system enters the change through a user interface module, such as module 334 (FIG. 3) and the change is stored in the local database, such as datastore 332. Further, upon making the change, a change log (not shown) may be updated to indicate one or more changes should be synchronized during the next synchronization operation.

Next, propagate operation 704 sends the change information to the primary computer system, such as system 302 (FIG. 3). Typically, a connect operation, such as operation 602 may be performed prior to propagate operation 704, i.e., before sending information from one system to another, the two systems must be communicably connected. Also, prior to sending the information, an embodiment sends type information, such as described above with respect to operation 604 such that the receiving primary computer system understands the format of the received change. In an embodiment, the received change relates to receiving an entire identity information document and in other embodiments, only the change is provided to the primary computer system. Of course, in order for the primary computer system to understand the update or change, some identifying information, describing the identity information document to be updated, must be transmitted along with the change information.

Upon receiving the change information, convert operation 706 converts the received information into a generalized form and stores or updates the general identity datastore, such as datastore 310 (FIG. 3). If, however, the update relates to a deletion operation, then operation 706 simply deletes the appropriate identity information document in the datastore. Also, if the update relates to a modification of an existing identity information document, then operation 706 may simply edit the existing identity information document located in the datastore, without such a conversion. In making the change to the datastore, a change log, such as change log 346 may be updated to indicate one or more changes should be synchronized during the next synchronization operation with other secondary computer systems.

Last, propagate operation 710 propagates the changes that originated from one secondary system (operations 702 and 704) to other secondary computer systems, such as system 306 (FIG. 3). The propagation of this change occurs in the manner described above with respect to flow 600 shown in FIG. 6. That is, the other secondary computer systems connect to the primary computer system and upon connection, the primary computer system determines that synchronization should occur, converts the updated information into the proper format for the connected secondary computer system, filters such information if necessary, and transfers the new information to the other secondary computer system.

Upon sending the new data to another secondary computer system, flow 700 ends at end operation 712. Of course, upon connection of yet another secondary computer system, the above changes are propagated to the next secondary computer system. Using the method described in flow 700, changes to an identity information datastore made on a secondary computer system may be propagated to any and all secondary computer systems associated with a particular user. For example, if a user has a PDA, a desktop computer system and a cellular telephone, the above method can be used to receive changes to principal's identity information on the PDA, which will then be synchronized to the desktop computer system to update the datastore on the desktop computer system. Next, during a synchronization event between the telephone and the desktop computer system, the change that was originally made on the PDA will be propagated from the desktop computer system to the cellular telephone and be stored on the cellular telephone.

Figure 8:
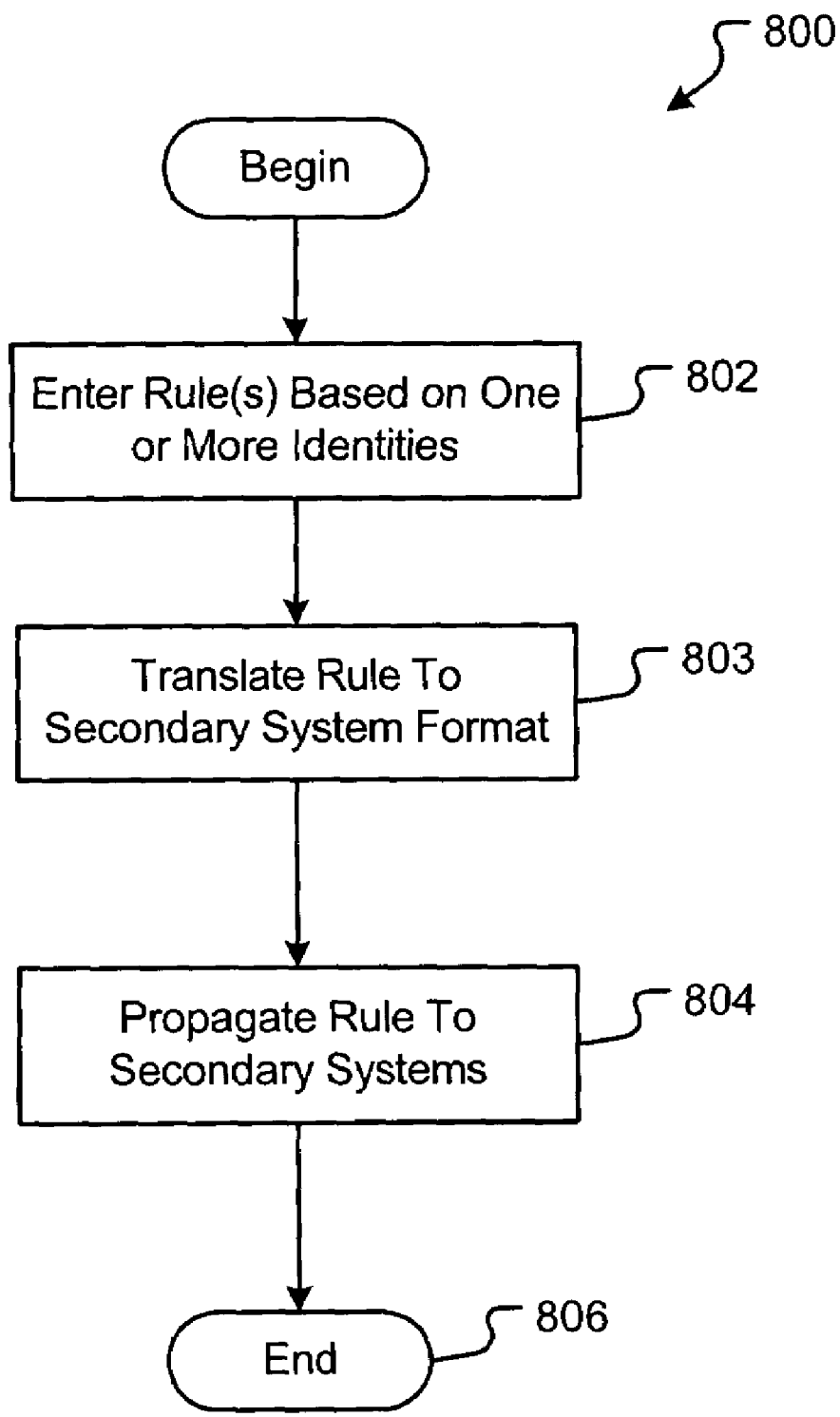
FIG. 8 is a flow diagram illustrating operational characteristics for a process for propagating rules from one system to another.

FIG. 8 is a flow diagram illustrating operational characteristics for a process for propagating rules from one system to another. Flow 800 is based on the above system wherein two or more computer systems have a concept of the various identities associated with the user of the two or more systems. For example, if a user of the primary computer system has established a database of known and trusted identities in their desktop computer system, then using the above systems and methods, the user may also have the same or representative database (albeit streamlined) on a secondary computer system such as a cellular telephone or on a PDA. Accordingly, the user may desire that certain rules be established regarding these identities. More importantly, the user may enter these rules on one computer system, such as the desktop computer system. Indeed, flow 800 begins with enter operation 802, wherein a rule is entered into a system, such as system 302 (FIG. 3). In other embodiments, a rule may be entered into one of the secondary computer systems such as systems 304 and 306 (FIG. 3).

At some point following the entering of the rule, translate operation 803 translate the rule into a format consistent with the secondary computer system. Typically, the translate process occurs following the determination to synchronize rule information and prior to the sending of the rule information to the secondary computer system. However, the translation could be done anytime between the entering of the rule into the primary computer system and the sending of the new rule information to the secondary computer system. The translation process 803 relates to translating a given rule into the proper format, or stated another way, into a rule that the secondary computer system is able to enforce. Since different secondary computer systems perform different functions, the rules may be different for the different systems. E.g., one system may block telephone calls in response to a rule, while another system may block emails.

Upon translating the rule, propagate operation 804 propagates the rule to one or more secondary computer systems. In an embodiment, propagate operation 804 occurs during a synchronization phase between two systems. The one or more secondary computer systems receiving the new, updated rules are able to enforce the rules.

Because system 302 represents a principal with a set of identity claims, rules which refer to principals can be transformed from one system to another. A rule on system 302 of "don't let Joe Smith bother me" can be translated to "don't accept calls from 555-1212 " on the phone device and "don't accept mail from joe@isp.com" on the mail server. Given that the different secondary systems have representative databases that understand who a principal is, e.g., Joe Smith, a user need not re-enter similar rules with on each system.

The above described system and method provides the ability to share a set of identities across many different computer systems, even when the different computer systems store portions of an identity and/or store the information in a different format. In doing so, the secondary systems need not store and execute complex computer applications in order to send, receive and store such identity information documents. Moreover, the system described above relates to including this functionality within an operating system of a primary computer system and/or on a programming platform.

Although the invention has been described in language specific to structural features, methodological acts, and computer readable media containing such acts, it is to be understood that the invention defined in the appended claims is not necessarily limited to the specific structure, acts or media described. As an example, many different identity information documents, including descriptive, credential and authorization information may be created and synchronized according to the principles of the above invention. Also, many different computer systems may be used as secondary computer systems, such as web portals or an Internet account, in accordance with aspects of the present invention. Therefore, the specific structure, acts or media are disclosed as preferred forms of implementing the claimed invention.

What is claimed is:

1. A method of synchronizing identity information between a primary computer system and a disparate secondary computer system, wherein the primary computer system and the secondary computer system store identity information in different formats and wherein the method comprises:
   connecting the primary computer system and the secondary computer system to provide communication capability between the primary computer system and the secondary computer system;
   determining new identity information exists on the primary computer system and that a synchronization operation should be performed by comparing identity information on the primary computer system with identity information on the secondary computer system;
   converting the new identity information into a different format, the different format associated with the secondary computer system; and
   propagating the converted new identity information to the secondary computer system,
   wherein the secondary computer system has a representative database of identity information following receipt of the converted information, wherein the representative database is representative of a primary database of identity information stored on the primary computer system, and
   wherein the representative database on the secondary computer system has less identity information than the primary database.

2. A method as defined in claim 1 wherein the process is performed by the operating system.

3. A method as defined in claim 1 wherein the secondary computer system is a telephone system and the identity information comprises contact information.

4. A method as defined in claim 1 wherein the secondary computer system is a handheld personal digital assistant computer system and the identity information comprises contact information.

5. A method as defined in claim 1 wherein the secondary computer system is a an email account system and the identity information comprises contact information.

6. A method as defined in claim 1 wherein the new identity information is entered into the primary computer system by a user.

7. A method as defined in claim 1 wherein the new identity information is entered into the primary computer system by another secondary computer system.

8. A method as defined in claim 1 wherein the conversion is performed by a dedicated process designed for the secondary system.

9. A method as defined in claim 1 wherein the conversion is performed by a generalized process designed to convert identity information into multiple different formats.

10. A method as defined in claim 9 further comprising:
    receiving a mapping table of information from the secondary computer system, wherein the mapping table maps identity claim elements in a primary format, wherein the primary format is the format of the primary database, to identity claim elements in a secondary format, wherein the secondary format is the format of the secondary database; and
    using the mapping table to convert identity information into the secondary format.

11. A computer program product readable by a computer system and tangibly embodying a program of instructions executable by the computer system to perform the method of claim 10.

12. A computer program product readable by a computer system and tangibly embodying a program of instructions executable by the computer system to perform the method of claim 1.

13. A method of synchronizing identity information between a secondary computer system and a disparate primary computer system, wherein the primary computer system and the secondary computer system store identity information in different formats and wherein the method comprises:
    connecting the primary computer system and the secondary computer system to provide communication capability between the primary computer system and the secondary computer system;
    determining new identity information exists on the secondary computer system and that a synchronization operation should be performed by comparing identity information on the primary computer system with identity information on the secondary computer system;
    propagating the new identity information to the primary computer system; and
    converting the new identity information into a different format, the different format associated with the primary computer system,
    wherein the determining step includes the secondary computer system having a representative database of identity information, wherein the representative database is representative of a primary database of identity information stored on the primary computer system, and
    the representative database on the secondary computer system having less identity information than the primary database.

14. A method as defined in claim 13 wherein the process is performed by the operating system.

15. A method as defined in claim 13 wherein the conversion is performed by a generalized process designed to convert identity information into multiple different formats.

16. A method as defined in claim 15 further comprising:
    receiving a mapping table of information from the secondary computer system, wherein the mapping table maps identity claim elements in a primary format, wherein the primary format is the format of the primary database, to identity claim elements in a secondary format, wherein the secondary format is the format of the secondary database; and
    using the mapping table to convert identity information from the secondary format into the primary format.

17. A computer program product readable by a computer system and tangibly embodying a program of instructions executable by the computer system to perform the method of claim 16.

18. A computer program product readable by a computer system and tangibly embodying a program of instructions executable by the computer system to perform the method of claim 13.

19. A network system for synchronizing identity information between a primary computer system and a disparate secondary computer system, wherein the primary computer system and the secondary computer system store identity information in different formats and wherein the system comprises:
- a synchronization interface that connects the primary computer system and the secondary computer system to provide communication capability between the primary computer system and the secondary computer system;
- a control module that determines new identity information exists on the primary computer system and that a synchronization operation should be performed by comparing identity information on the primary computer system with identity information on the secondary computer system;
- a conversion module for converting the new identity information into a different format, the different format associated with the secondary computer system; and
- a synchronization module for propagating the converted information to the secondary computer system,
- wherein the secondary computer system has a representative database of identity information following receipt of the converted information, wherein the representative database is representative of a primary database of identity information stored on the primary computer system, and
- wherein the representative database on the secondary computer system has less identity information than the primary database.

20. A system as defined in claim 19 wherein the secondary computer system is a telephone computer system.

21. A system as defined in claim 19 wherein the secondary computer system is a handheld personal digital assistant computer system.

22. A system as defined in claim 19 wherein the secondary computer system is an email server computer system.

23. A system as defined in claim 19 wherein the conversion module accesses a predetermined table of mapping information associated with the secondary computer system to convert the identity information into the proper format.

24. A system as defined in claim 23 further a comprising second synchronization interface for communicating with another secondary computer system and wherein the conversion module converts identity information into another secondary format for the another secondary computer system.

25. A system as defined in claim 19 wherein the primary computer system has a user interface module and the new identity information is entered on the primary computer system through the user interface module.

26. A system as defined in claim 25 wherein the new identity information received from the third computer system is converted into a format for the primary computer system and stored in a primary database, the new identity information is then converted into the format for the secondary computer system and transferred to the secondary computer system.

27. A system as defined in claim 19 wherein the new identity information originates from a third computer system.

* * * * *